Jan. 7, 1936. W. L. DOUDEN 2,027,028
APPARATUS FOR MAKING COMPOSITE TALKING MOTION PICTURES
Filed March 1, 1932 2 Sheets-Sheet 1
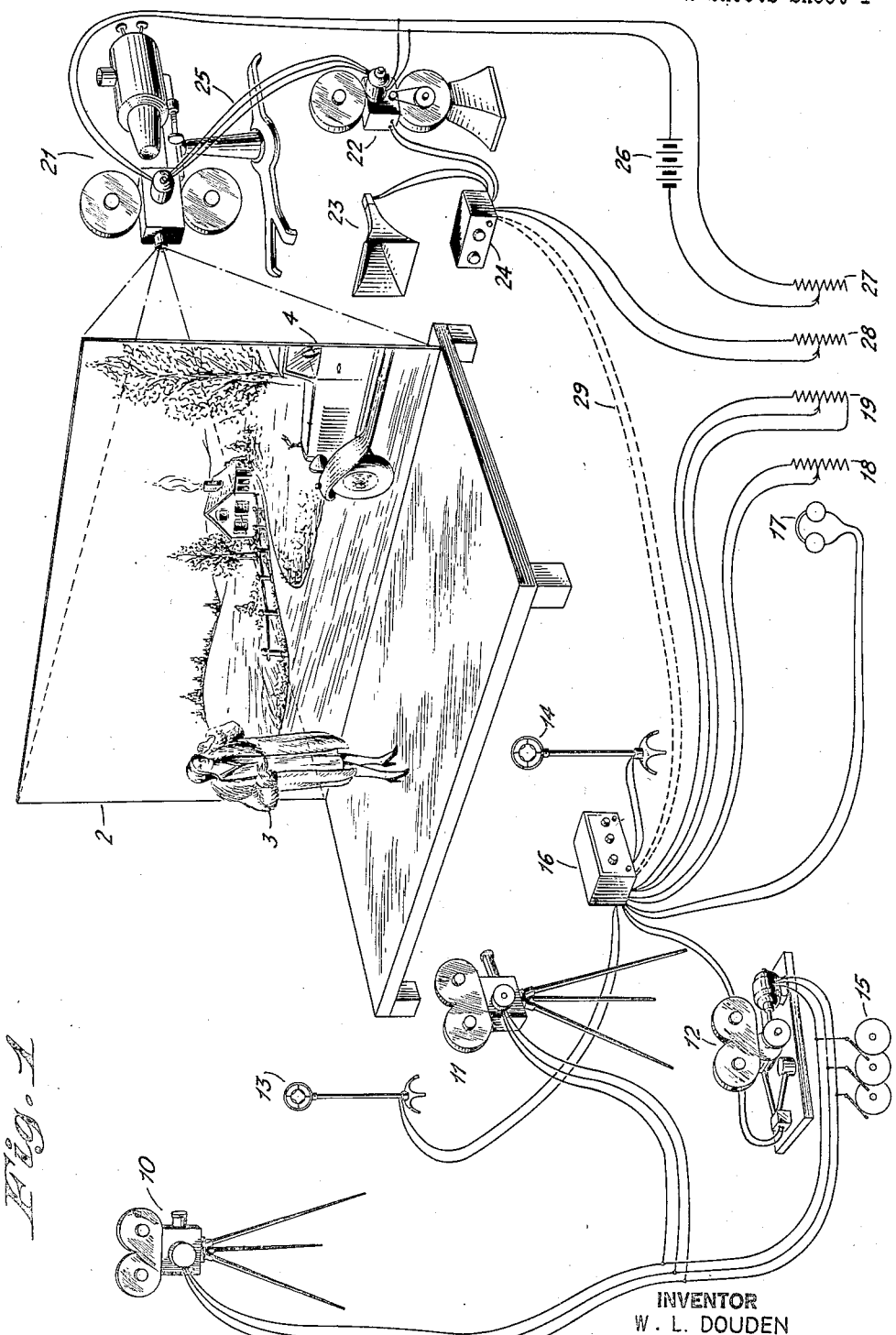
INVENTOR
W. L. DOUDEN
BY
ATTORNEY Jan. 7, 1936. W. L. DOUDEN 2,027,028
APPARATUS FOR MAKING COMPOSITE TALKING MOTION PICTURES
Filed March 1, 1932 2 Sheets-Sheet 2
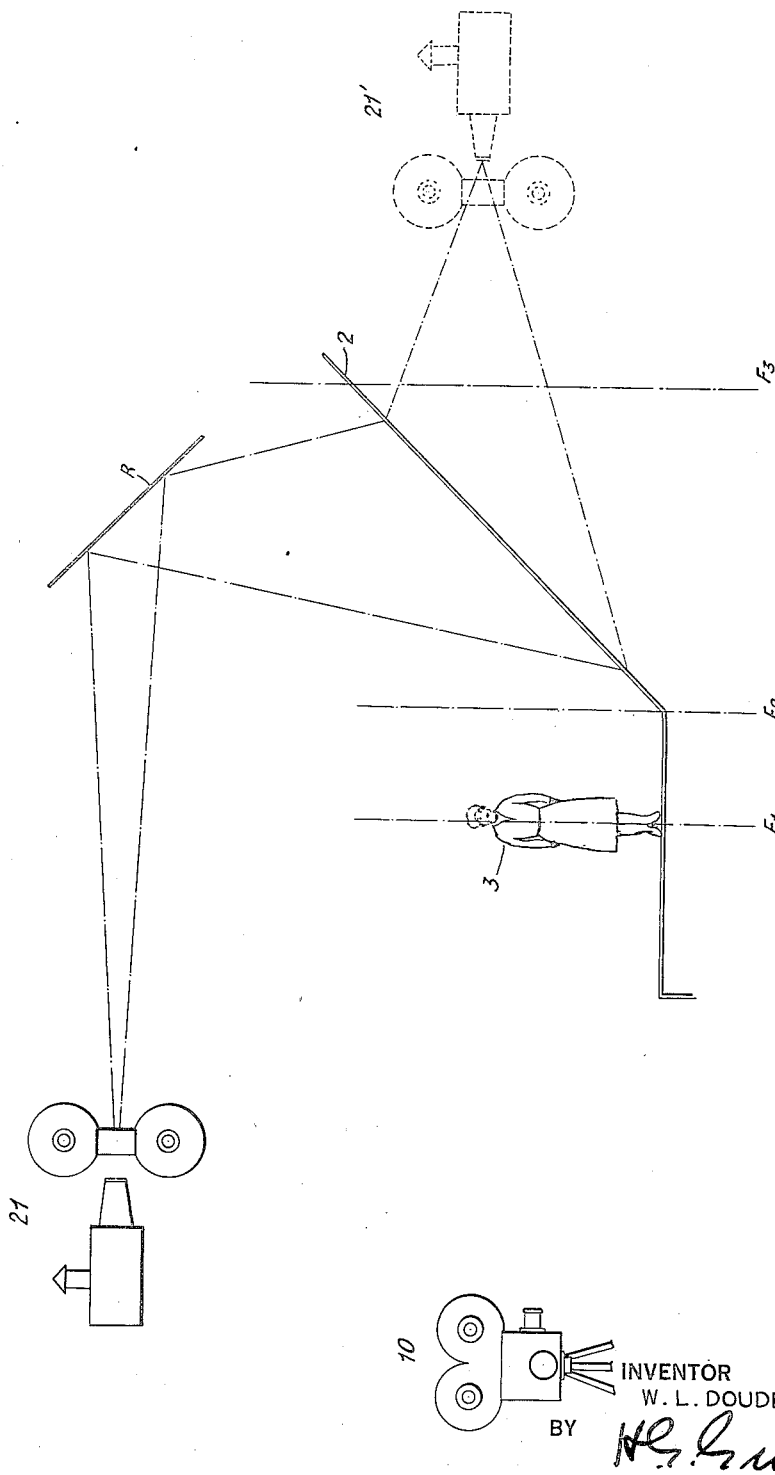
INVENTOR
W. L. DOUDEN
BY
ATTORNEY Patented Jan. 7, 1936

2,027,028

UNITED STATES PATENT OFFICE 2,027,028

APPARATUS FOR MAKING COMPOSITE TALKING MOTION PICTURES

William L. Douden, Brooklyn, N. Y., assignor to Radio Corporation of America, a corporation of Delaware Application March 1, 1932, Serial No. 596,028

1 Claim. (Cl. 88—16)

This invention relates to an apparatus for making talking motion pictures and more particularly the variety of such pictures wherein there is a composite photographic effect or composite sound effect, or both composite photographic and sound effects, all being properly synchronized and in proper relation to each other.

The invention involves the projection of a background by means of what is known as a "continuous" projector or "optical rectifier" and the reproduction, synchronized with such background projection, of appropriate sounds to suit the background action, and the photography of the background and foreground action together with appropriate sound recording by a camera and sound recorder synchronized with each other but not necessarily synchronized with the background mechanism.

Heretofore backgrounds have been projected by means of intermittent projectors, but the use of such apparatus necessitates exact synchronization and either mechanical or electrical interconnection between the background projector and the camera taking the scene in order that the picture may be projected upon the screen at the same time that the camera shutter is opened, and this in conjunction with the exact speed limitation of present-day sound recording equipment requires an extremely exact timing of the entire action of the scene where the picture to be produced is truly a composite rather than including merely a background. The same limitation applies to even a greater degree where the composite effect is produced either in printing or what amounts to a printing process in the camera, as in either of these cases the entire action must be timed to a fraction of a second.

One object of the present invention is to provide an apparatus for producing such a projected background at a controllable speed.

Another object of the invention is to provide audible sounds corresponding to the background in conjunction therewith to assist the actors in properly co-ordinating their actions.

Another object of the invention consists in providing means for re-recording background sounds either directly or indirectly upon the composite sound record.

Another object of the invention consists in providing means controllable from an appropriate observation point such, for example, as the usual location of the "director" for controlling the speed of operation of the background picture.

Another object of the invention consists in a provision of means controllable from a similar point for controlling the intensity of the background sound either as reproduced or as recorded.

Another object of the invention is to provide a new method of photographing such a projected background.

In the drawings:

Fig. 1 is a schematic diagram of the arrangement of and apparatus used in the performance of my process.

Fig. 2 is a schematic diagram of a modified arrangement of the background projecting apparatus.

Referring first to Fig. 1, 2 indicates a projection screen, in this case of the translucent type, upon which the background and background action is to be projected and which is to be photographed in conjunction with the action occurring in front thereof such, for example, as indicated at 3. This background may include objects capable of movement and of producing distinctive sounds or noises such, for example, as the automobile indicated at 4.

This composite scene is photographed and the sounds therefrom are recorded by an usual synchronized sound and picture mechanism and in the present instance this is indicated as of the film sound record type wherein the cameras 10 and 11 and the sound recorder 12 are driven synchronously from an appropriate source of alternating current 15, cameras 10 and 11 being of any usual type.

The sounds are picked up by the microphones 13 and 14 and passed through the usual amplifier 16 and then to the recorder 12, and the amplifier is provided with the usual controlling mechanism such as the monitoring 'phones 17, volume control 18 and mixer 19, all these being of any usual type.

The background is projected upon the screen 2 by means of a projector 21, and this projector is of the type wherein the film moves continuously and the image is projected continuously on to the screen, one frame being dissolved into the next and the motion of the film being optically compensated for by the appropriate mechanism so that there is at all times a picture upon the screen 2 and it is unnecessary to adjust the cameras 10 and 11 to be in exact synchronization and phasing with the projector 21 and with each other as would be the case if an intermittent projector were used. Such continuous projectors are disclosed, for example, in Mechau Patent Number 1,584,317 or Kosken Patents 1,672,222; 1,673,250; 1,673,251 and 1,673,252 or Continsouza Patent 1,690,770 and need not be further described here.

This projector 21 is preferably electrically driven from an appropriate source of current, such for example, as the battery indicated at 26 or any equivalent supply, by means of a variable speed motor. In the present instance, the speed control is indicated as a variable resistance 27 which serves to control the curent supplied to the motor driving projector 21 but obviously any preferred form of speed control may be used.

Synchronized with this projector 21, there is a sound reproducing mechanism such, for example, as the film type sound reproducer indicated at 22 which of course might be built into the projector 21 in the same manner as is customary in intermittent projectors in present theatre equipment, or may be electrically synchronized therewith by, for example, synchronizing connections indicated at 25 or may be mechanically connected to the projector, the only esential requirement being that the sounds reproduced by the mechanism 22 correspond properly with the background projected by the apparatus 21.

In the present instance this sound reproducer as indicated is of the film type because in producing such backgrounds it may be desirable to use scenes which have been photographed at one time or place and sound records which have been made at a different time or place, and the arrangement illustrated permits any desired arrangement of pictures and sound to be provided without the necessity for printing them upon a single film which, though more convenient for commercial theatre use, is less conventient where it is only necessary to reproduce the picture a very small number of times.

The sound pick-up in the mechanism 22 is preferably of the usual photoelectric type and the output therefrom is fed to an amplifier 24.

A loudspeaker 23 is provided in proper relation to the rest of the mechanism, preferably behind the screen, for the reproduction of the sounds corresponding to the background; and in addition to this a connection 29 may be provided from the amplifier 24 to the amplifier 16.

It will be apparent that the microphones 13 and 14 will pick up sounds both from the action at 3 and from the loudspeaker 23 and if the action at 3 is properly synchronized with or related to the action projected upon the screen 2, the picture as taken by the cameras 10 and 11 and the sound as recorded by the recording mechanism 12 will all be in the desired relation.

The loudspeaker 23 further assists the actors in maintaining their action in proper relation to the background, inasmuch as all the background sounds are clearly audible to them.

It may be desired, for acoustic reasons, to avoid recording any appreciable quantity of the sound from the loudspeaker 23 but rather to record directly from the film phonograph 22 through the appropriate electrical channels to the recorder 12 and in this case the connection 29 is used, the loudspeaker 23 being so adjusted as to produce sounds just sufficiently audible to the actors, or it may be left inoperative.

The amplifier 24 is provided with an appropriate volume control 28 which is placed in a location such that the operator thereof can judge the composite effect of the sound produced, and this is preferably at the point where the director of the picture is stationed or at some corresponding viewpoint and preferably in rather close proximity to the speed control 27 which controls the speed of the background.

The volume control 28 is particularly useful if the loudspeaker is used for producing the background sounds. If the loudspeaker is not used and the connection 29 is used instead, the volume from the film phonograph 22 can be controlled by either the volume control 28 or by the mixer 19 or both.

A modified arrangement of the projecting mechanism is shown in Fig. 2 where the projection screen 2 is indicated as being sloped at an angle to the stage instead of being vertical.

In this case the projector 21 can be so located as to project its image upon the front of the screen through the assistance of the reflector R or it may be located as indicated at 21' to project the image upon the back of a translucent screen. The illustration is of course diagrammatic and errors of distortion and focus of the projectors would, in practice, be corrected in one of the usual ways of providing such correction as is used, for example, in theatres.

The camera 10 is of course located, as in Fig. 1, in any appropriate relation to the scene being taken.

The arrangement of Fig. 2 presents some additional advantages in the photography of such a composite scene, although it is obviously not quite as convenient to project the image upon the screen.

If, for example, the camera uses a fairly wide angle lens and is focussed sharply upon the image plane indicated at $F_1$ then the image $F_2$ at the front of the projected background is somewhat less sharp and the image plane $F_3$ at the rear of the projected background is considerably less sharp. If, as is quite often the case, the objects of the background increased in distance toward the top thereof and if the film showing the background has been taken to show the proper amount of detail, this permits the photographer to choose not only the sharpness with which the background is shown but the sharpness with which the relative parts of the background are shown to best suit the requirements of the particular scene being taken.

For example, if it is desired to show the actors and the background of any fairly sharp detail, a rather strong illumination will be used and a fairly small stop will be used on the camera so that the difference in sharpness of focus of the relative image planes $F_1$ $F_2$ $F_3$ will not be noticeable, but if it is desired to show the actors at $F_1$ very sharply in focus and the portion of the background in $F_2$ very slightly out of focus, becoming more rapidly out of focus as it approaches $F_3$ as for example to produce the effect of great distance, then a lens of large aperture would be used and focussed sharply at $F_1$, the exposure being controlled in the usual manner in such cases, i. e., by the use of neutral filters or a decrease in illumination, and the desired result as to focus will necessarily follow.

The arrangement of microphones, amplifiers, etc. in Fig. 2 would of course be similar to that of Fig. 1 and they therefore are not shown.

It will be apparent that it is not necessary for the background to be projected on the screen to the rear of the actors but that either the projection screen or the actors may be in a different line of view from the axis of the camera, and the image thereof reflected as, for instance, by a transparent reflector, onto the proper portion of the film.

In the following claim the words "continuous" or "continuously" are not used in the sense of limiting the duration of the scene nor of requiring the film to be recurrently projected, but are merely used to distinguish from the common "intermittent" projectors.

I claim:

Apparatus for producing composite pictures comprising means for receiving projected images, means for supporting objects in predetermined relation to said first means, means for projecting optically rectified uninterrupted background pictures upon said receiving means, means for photographing both the objects and the projected images at a speed independent of the speed of operation of said optically rectifying projector, means for driving the photographing means at a constant speed, means for driving the optically rectifying projecting means, and means for controlling the speed of the last-named drive means independently of the speed of the photographing means.

WILLIAM L. DOUDEN.